United States Patent [19]

Kimble

[11] Patent Number: 4,781,422

[45] Date of Patent: Nov. 1, 1988

[54] ADJUSTABLE CLUTCH MECHANISM

[75] Inventor: Thomas E. Kimble, Covington, Ky.

[73] Assignee: Random Corporation, Cincinnati, Ohio

[21] Appl. No.: 798,861

[22] Filed: Nov. 14, 1985

[51] Int. Cl.⁴ .............................................. A47B 81/06
[52] U.S. Cl. ...................................... 312/72; 16/337; 312/208; 312/327
[58] Field of Search ........................ D6/429, 430, 431; 108/8, 6, 1; 248/133, 242, 1 B; 400/713, 714; 312/7.2, 208, 327, 328, 242; 16/337, 338, 339, 340; D14/114; 192/70.25, 70.26, 111 B

[56] References Cited

U.S. PATENT DOCUMENTS

| | | | |
|---|---|---|---|
| 282,164 | 1/1886 | Krop | D14/114 X |
| 2,441,455 | 5/1948 | Tetzman | 16/337 X |
| 2,608,713 | 9/1952 | Goss | 16/337 |
| 2,883,254 | 4/1959 | Bacca | 16/337 X |
| 3,579,709 | 5/1971 | Pierie | 16/337 X |
| 4,274,128 | 6/1981 | Malis | 16/337 X |
| 4,392,686 | 7/1983 | Beer | 16/337 X |
| 4,456,315 | 6/1984 | Markley et al. | 312/7.2 X |
| 4,552,418 | 11/1985 | Sarnezki et al. | 312/242 |

FOREIGN PATENT DOCUMENTS

| | | | |
|---|---|---|---|
| 58242 | 8/1982 | European Pat. Off. | 312/7.2 |
| 2847135 | 5/1980 | Fed. Rep. of Germany | 248/1 B |
| 581916 | 9/1958 | Italy | 312/7.2 |

Primary Examiner—Peter A. Aschenbrenner
Assistant Examiner—Thomas A. Rendos
Attorney, Agent, or Firm—Eugene F. Friedman

[57] ABSTRACT

An adjustable clutch mechanism for fixing the relative position of two objects rotationally coupled relative to each other. The pressure resisting the change of rotational position submits to adjustment to permit facile movement but yet resists change from the selected position. The mechanism finds particular utility for holding a portable computer terminal's cover containing a display at a desired position relative to the base containing the keys. The clutch mechanism itself includes two sets of annular rings held against each other by a nut and bolt pressing against a spring which in turn presses against one of the rings. Tightening the screw applies greater pressure to the rings and prevents the relative rotation. The first set of the rings moves with the cover while the second set of rings has a fixed rotational orientation relative to the base. A tubular shaft, affixed to the base, passes through the center of the rings engaging tabs of the second set. The shaft keeps the second set from moving relative to the base. Tabs extending outwardly from the first set contacts one of the arms holding the cover to the base; these tabs, and thus the first set of rings, move with the arms and thus the cover.

22 Claims, 2 Drawing Sheets

ADJUSTABLE CLUTCH MECHANISM

BACKGROUND

Portable computer terminals typically have a base with the keys and a cover rotationally coupled to the base. The cover often includes an LCD display to show the information placed into the terminal's memory either through the keys or through an input/output port. Accordingly, the cover, as a consequence, possesses appreciable inherent weight.

However, the use of the portable terminal requires the placement of the cover at an orientation relative to the base that will permit the facile viewing of the display. Local light conditions and the height of the user will determine the precise angle of the cover at which the proper viewing may occur.

Various mechanisms have found use to hold the cover at a desired angle relative to the base. Some make use of positive stops to prevent the cover from moving out of the desired position. However, the lack of infinite adjustability often means that the cover cannot remain at the optimum viewing angle for a particular environment.

Other mechanisms attempt to achieve a frictional retention of the cover relative to the base. However, the weight of the cover sits to one side of the axis of rotation. Accordingly, it generally has a substantial torque created by the pull of gravity. It thus shows a tendency to rotate towards the ground. Often, the friction mechanism does not possess sufficient strength to hold the cover at a desired position other than substantially vertical. However, again a substantially vertical orientation may not prove optimal for the proper viewing of the display.

Accordingly, the search continues for a mechanism that will hold the cover of a portable computer terminal at a particular desired angle relative to the base. This mechanism should have sufficient strength to retain the cover at its selected position even where that position lies away from the vertical plane. Moreover, the mechanism should generally permit infinite variability in the rotational position of the cover relative to the base.

SUMMARY

A desired clutch mechanism can find use on first and second objects coupled together to have rotational freedom relative to each other over a predefined arc about an axis. Specifically, the mechanism should retain these two objects at any of a plurality of preselected positions over that arc of rotational freedom. As a specific example, one of the objects may represent the cover of a portable computer terminal, while the second object constitutes the base.

The actual clutch itself includes initially a first set of a plurality of substantially flat surfaces. A first holding device then couples to the surfaces in this set and to the first object. It has the function of retaining the surfaces of the first set substantially parallel to each other and at a fixed spatial orientation relative to the first object. In more simple terms, it prevents the surfaces from moving relative to the first object; holding these first surfaces immobile prevents the movement of the object itself.

Similarly, a second set of a plurality of substantially flat surfaces couples through a second holding device to the second object. As a consequence, the second set of surfaces remains substantially parallel to each other and has a fixed spatial orientation relative to that second object. Naturally, the surfaces of the first and second sets have sufficient size and a location that they remain in contact with each other as the first and second objects rotate through their permissable range.

Further, to provide a frictional hold between the surfaces of the two sets, the clutch requires a pressure device coupled to the first and second sets of surfaces. This device holds the two sets of surfaces in contact with each other by applying a pressure against them. This pressure remains substantially constant as the first and second objects rotate relative to each other about their predefined arc.

Lastly, the pressure applied by the device to the two sets of surfaces should submit to adjustment. This allows for the application of a greater or lesser pressure to permit facile movement of the objects on the one hand. Yet it creates sufficient friction to maintain the relative spatial orientation of the two objects on the other hand.

For a computer terminal, a bolt and nut applying pressure through a spring to two sets of annular rings can create the necessary friction to prevent any undesired rotation of one set of rings about the other. One set of rings remains fixed relative to the terminal's base while the other moves with the cover. This permits the containment of the clutch within a small space while achieving sufficient friction between the rings to keep the cover with the display at any desired viewing position.

DETAILED DESCRIPTION

Figure 1:
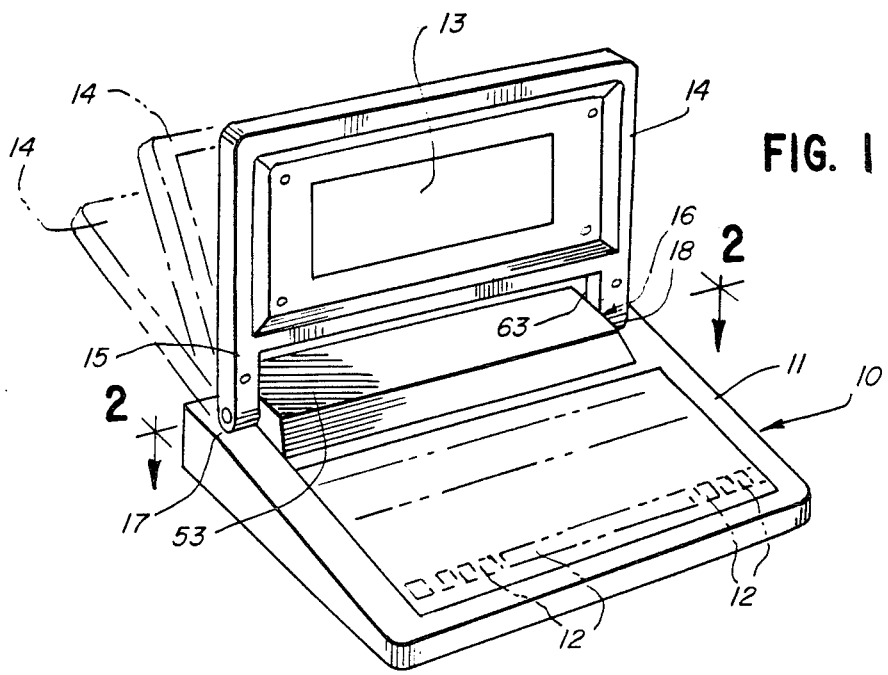
FIG. 1 provides an isometric view of a portable computer terminal in which the cover can remain at any of a plurality of positions relative to the base for optimal viewing.

FIG. 1 shows the portable computer terminal generally at 10 having the base 11 with the keys 12 shown in phantom. The LCD display 13 appears on the terminal's cover 14 which the two arms 15 and 16 connect to the base 11. As shown by the phantom outlines, the cover 14 rotates about its connections 17 and 18 to the base 11. The operator may select the position which will provide the best angle to view the LCD display 13.

Figure 2:
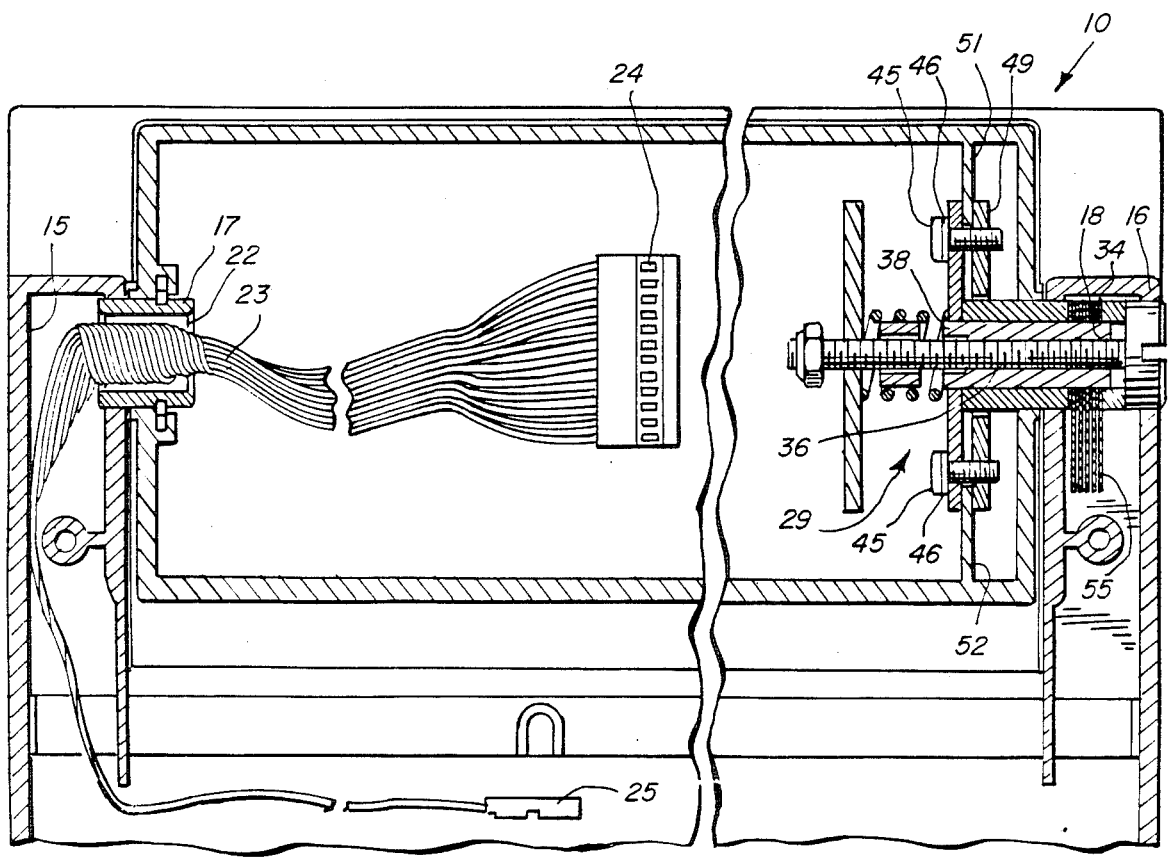
FIG. 2 gives a cross-sectional view along the line 2—2 of the portable computer terminal of FIG. 1.

In FIG. 2, the journaled connection 17 of the arm 15 has a sufficient opening 22 to permit the passage of the cable 23 into the arm 15. At one end, the cable 23 has the connector 24 which couples to the computer to receive information for display. At its other end, the connector 25 couples to the LCD display 13 itself.

On the other side of FIG. 2 appears the clutch mechanism generally at 29 which holds the cover 14 in any of its infinite positions, including those shown in FIG. 1. The components of the clutch 29 appear in exploded detail in FIG. 3 which shows the mechanism from the rear and bottom.

Figure 3:
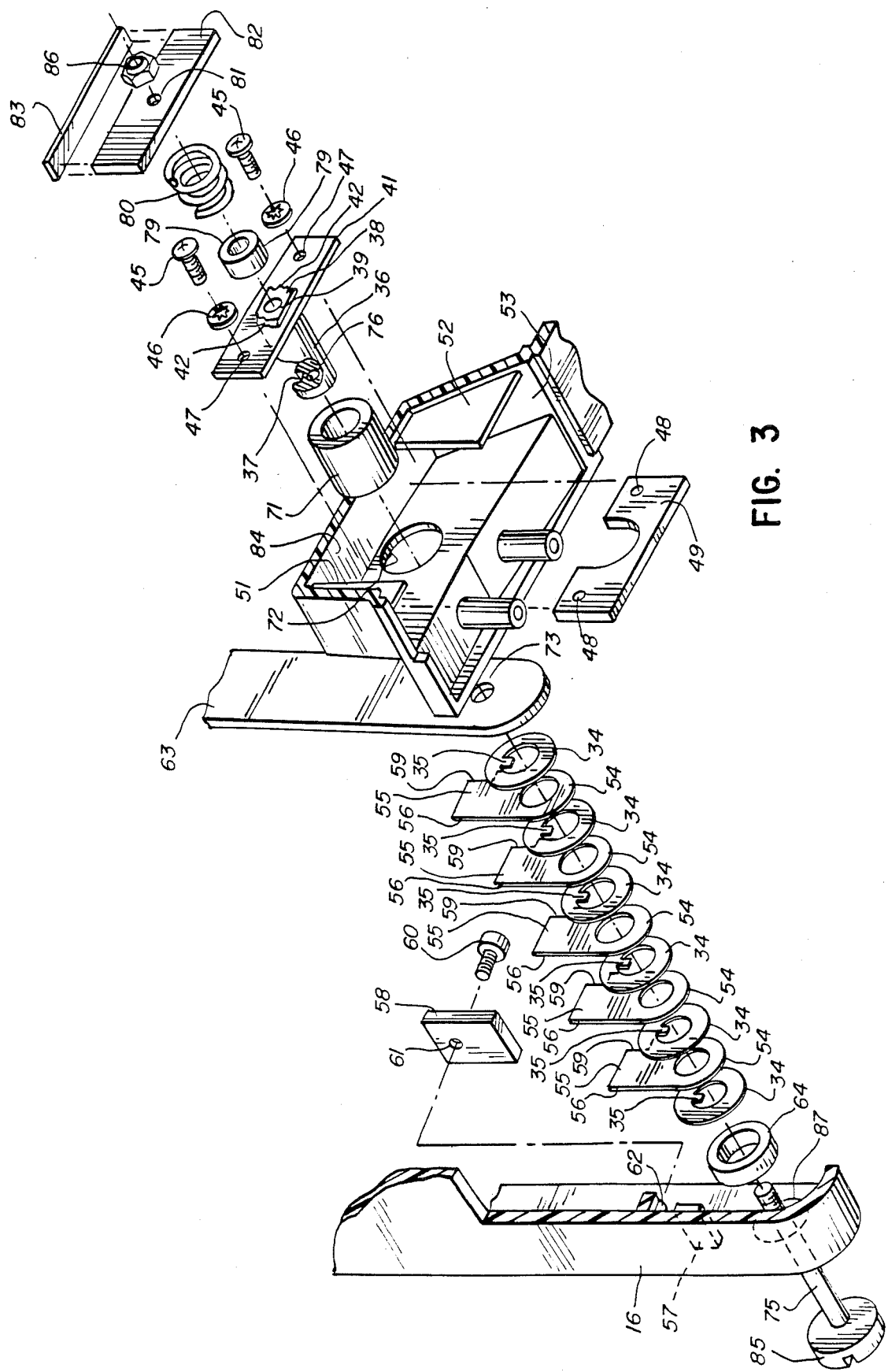
FIG. 3 provides an exploded view of the components of an adjustable clutch mechanism that will serve to hold the cover of the portable computer terminal in FIG. 1 at a preselected position.

In FIG. 3 appear the six rings 34 which have the tabs 35 pointing towards their centers. The rings 34 fit over the tubular shaft 36 which has the groove 37 cut into its side. The inwardly pointing tabs 35 on the rings 34 fit into the groove 37 on the shaft 36. The arrangement of the tabs 35 in the groove 37 assures that the rings 34 will maintain a fixed orientation relative to the shaft 36.

The shaft's end 38 has a shape including the flat surfaces 39 and 40 which fit into a conforming opening in the plate 41. The swaging 42 permanently attaches the shaft 36 to the plate 41. As a consequence of the surfaces 39 and 40 fitting into the opening in the plate 41, the shaft 36 has a fixed orientation relative to the plate 41. As a result, the rings 34 also must have a fixed orientation relative to the plate 41.

The screws 45 then pass through the locking washers 46 and the openings 47 in the plate 41. They then may screw into the tapped openings 48 of the plate 49. In operation, the screws 45, in effect, hold the plates 41 and 49 together. However, they do so with the plates 41 and 49 lying on either side of the tabs 51 and 52 which form part of the top 53 of the base 11 (of FIG. 1). In particular, under the action of the screws 45, the plates 41 and 49 squeeze the tabs 51 and 52 between them. As a consequence, the plate 41 has a fixed orientation relative to the top 53 and, thus, the base 11 itself.

The rings 54, in turn, sit between the rings 34. The rings 54 have the large extensions 55 directed away from their centers. The rings 54 with their extension 55 sit in the arm 16. The backs 56 of the extensions 55 rest against the protective felt 57 attached to the arm 16.

Further, the plate 58 fits into the corner notches 59 in the extensions 55. The bolt 60 passes through the opening 61 of the plate 58 and screws into the plastic extension 62 of the arm 16. As a consequence, the extensions 55 remain entrapped between the felt piece 57 attached to the arm 16 and the plate 58, also attached to the arm 16. As a consequence, the rings 54 are constrained to move with the arm 16.

Naturally, the rings 54 fit over the shaft 36. However, since they have a smooth, circular interior with no tab fitting into the groove 37, they may move freely around the shaft 36. Thus, as the arm 16 moves, so do the rings 54, which rotate around the shaft 36.

In the meantime, as stated above, the rings 34 remain fixed relative to the shaft 36. As a result, the movement of the top 13 and, thus, the arm 16 causes the rings 54 to move relative to the rings 34. The pressure holding the rings 34 against the rings 54, as discussed below, create the friction that will preclude undesired movement of the arm 16 of the top 14. Avoiding excessive pressure will still permit the user to close the top 14 by the application of a force against the top itself.

The rings 54, as well as the rings 34, sit within the arm 16 where the inner plate 63, forming part of the arm 16, covers them from view. The spacer 64 keeps the outer ring 34 away from the outer edge of the arm 16.

When assembled, the spacer 71 fits over the shaft 16 and against the plate 41. The spacer, in turn, sits within the opening 72 in the top 53 of the base 11 and the opening 73 within the inner arm cover 63. The spacer 71 serves as a bearing to protect these components and the shaft 36 from each other. The shaft 36 then passes through the rings 34 and 54 and finally the spacer 63.

Coming from the other direction, the bolt 75 passes through the center opening 76 of the shaft 36. As the bolt 75 passes through the opening 76 through the shaft 36, it also passes through the spacer 63, the rings 34 and 54, the inner arm cover 63, and the spacer 71. All of these sit around the shaft 36.

After exiting the shaft 76, the bolt 75 passes through the plastic spacer 79 which sits inside of the spring 80.

The spacer 79 has the function of protecting the spring 80 and the bolt 75 from each other.

Lastly, the bolt screws into the tapped opening 81 of the plate 82. The piece of felt 83 adheres to the top of the plate 82 and, in turn, rests against the upper surface 84 of the top 53 of the base 10. Resting against the surface 84 prevents the plate 82 from rotating relative to the bolt 75. The felt 83 protects the plastic surface 84. The self-locking nut 86 prevents the disengagement of the bolt 75 from the tapped opening 81 in the plate 82.

Tightening the bolt 75, which is screwed into the tapped opening 81, causes the bolt head 85 and the plate 82 to move toward each other. The action of the spring 80, of course, opposes this motion. However, continued tightening of the bolt 75 results in the application of pressure on all of the components sitting between the bolt head 85 and the plate 82. In particular, this pressure forces the plates 34 and 54 against each other to create friction between them and oppose the relative rotational movement of the plates 34 relative to the rings 54.

Tightening the bolt 75 sufficiently will create enough friction to cause the terminal top 14 to remain at the location where placed by the user. In particular, it does so even though none of the individual rings 34 or 54, alone, would possess adequate surface area to create the friction required to hold the top 14 in place. However, the cumulative effect of all the rings 34 pressing against all the rings 54 create the requisite friction.

As seen from the above, the only components that move with the terminal top 14 include the arm 16, the inner arm cover 63, and the rings 54. The opening 87 in the arm 16 has sufficient size that it does not make contact with the bolt head 85.

Additionally, the shaft 36 sits between the moving rings 54 and the bolt 75. As indicated above, the shaft 36 does not move as the arm 16 and thus the top 14 rotate. As a result, none of the moving components, as the operator raises and lowers the computer terminal top 14, makes any contact with the bolt 75. Consequently, the action of opening and closing the computer top cannot change the position of the bolt 75 or the pressure it creates between the rings 34 and 54. In other words, the bolt 75 only contacts nonrotating components of the clutch mechanism 29.

Accordingly, what is claimed is:

1. A clutch mechanism for retaining first and second objects, coupled together to have rotational freedom relative to each other over a predefined arc about an axis, at any of a plurality of preselected positions about said axis, said mechanism comprising:
(A) a first set of a plurality of substantially flat surfaces, at least two of said flat surfaces of said first set being formed from separate pieces of material physically unattached to each other;
(B) first holding means, coupled to said first set of surfaces and to said first object, for retaining said surfaces of said first set substantially parallel to each other and at a substantially fixed spatial orientation relative to said first object, said first holding means permitting surfaces of said first set to move translationally toward and away from each other;
(C) a second set of a plurality of substantially flat surfaces, at least two surfaces of said second set being formed from separate pieces of material physically unattached to each other, said surfaces of said first and second sets being sufficiently large and having locations that at least one surface of said second set sits between any two surfaces of said first set that are free to move forward and away from each other and at least one surface of said first set sits between any two surfaces of said second set that are free to move toward and away from each other and said surfaces of said first set make contact with said surfaces of said second set at all orientations of said first and second objects within said arc about said axis;

(D) second holding means, coupled to said second set of surfaces and to said second object, for retaining said surfaces of said second set substantially parallel to each other and at a substantially fixed spatial orientation relative to said second object; said second holding means permitting surfaces of said second set to move translationally toward and away from each other;

(E) pressure means, coupled to said first and second sets of surfaces, for holding, with an adjustable, predetermined, substantially constant pressure, said first set of surfaces in contact with said second set of surfaces as said first and second objects rotate, relative to each other, about said axis through said arc.

2. The mechanism of claim 1 wherein said surfaces of said first and second sets extend 360° around said axis and said pressure means maintains contact of the surfaces of said first and second sets in a continuous line around said axis for all of said preselected positions.

3. The mechanism of claim 2 wherein said lines along which said surfaces of said first and second sets make contact about said axis, forms at least one circle centered on said axis.

4. The mechanism of claim 3 wherein said pressure means holds said first and second sets at any position over said predefined arc.

5. The mechanism of claim 4 wherein each of said surfaces of said first set forms an annular ring centered on said axis.

6. The mechanism of claim 5 wherein (a) each of said surfaces of said second set constitutes an annular ring centered about said axis and (b) said second holding means includes (1) a tab extending from said ring towards said axis, (2) a tubular shaft passing through the center of the rings of said first and second sets, said shaft having a notch in the outer surface thereof into which said tabs of said surfaces of said second set enter, and (3) means for holding said shaft rigid relative to said second object.

7. The mechanism of claim 6 wherein said pressure means includes a spring, centered about said axis, a bolt with a head and passing through the center of said surfaces of said first and second sets, said spring, and said tubular shaft, and a nut screwed onto said bolt, said surfaces of said first and second sets and said spring lying between the said head of said bolt and said nut with said head of said bolt and said nut urging said surfaces of said first and second sets and said spring toward each other.

8. The mechanism of claim 7 wherein said bolt and said nut only make contact with surfaces remaining fixed relative to one of said first and second objects.

9. The mechanism of claim 8 wherein said second object constitutes a base, said first object rotates around said base and is attached thereto by arms forming part of said first object and extending to either side of at least a portion of said base, and said surfaces of said first and second sets are located within one of said arms.

10. The mechanism of claim 9 wherein said first holding means includes tabs affixed to said surfaces of said first set, said tabs extending from said surfaces in a direction away from said axis, said tabs being coupled to and moving with said arm.

11. The mechanism of claim 10 including retaining means, coupled to either said bolt or said nut, for inhibiting the disengagement of said bolt from said nut.

12. A computer terminal having (1) a base with a keyboard, and (2) a cover having a display, said cover being attached to arms coupled to said base to have rotational freedom relative to said base over a predefined arc, about an axis passing through said base and said arms, and (3) a clutch mechanism for retaining, at a preselected position, said base and said cover, said mechanism comprising:

(A) a first set of a plurality of substantially flat surfaces, at least two of said flat surfaces of said first set being formed from separate pieces of material physically unattached to each other;

(B) first holding means, coupled to said first set of surfaces and to said cover, for retaining said surfaces of said first set substantially parallel to each other and at a substantially fixed spatial orientation relative to said cover said first holding, means permitting surfaces of said first set to move translationally toward and away from each other;

(C) a second set of a plurality of substantially flat surfaces, at least two surfaces of said second set being formed from separate pieces of material physically unattached to each other, said surfaces of said first and second sets being sufficiently large and having locations that at least one surface of said second set sits between any two surfaces of said first set that are free to move forward and away from each other and at least one surface of said first set sits between any two surfaces of said second set that are free to move toward and away from each other and said surfaces of said first set make contact with said surfaces of said second set at all orientations of said cover and base within said arc about said axis;

(D) second holding means, coupled to said second set of surfaces and to said second base, for retaining said surfaces of said second set substantially parallel to each other and at a fixed spatial orientation relative to said base said second holding means permitting surfaces of said second set to move translationally toward and away from each other;

(E) pressure means, coupled to said first and second sets of surfaces, for holding, with an adjustable, predetermined, substantially constant pressure, said first set of surfaces in contact with said second set of surfaces as said cover and base rotate, relative to each other, about said axis through said arc.

13. The terminal of claim 12 wherein said surfaces of said first and second sets extend 360° around said axis and said pressure means maintains contact of the surfaces of said first and second sets in a continuous line around said axis for all of said preselected positions.

14. The mechanism of claim 13 wherein said lines along which said surfaces of said first and second sets make contact about said axis, forms at least one circle centered on said axis.

15. The mechanism of claim 14 wherein said pressure means holds said first and second sets at any position over said predefined arc.

16. The mechanism of claim 15 wherein each of said surfaces and said first set forms an annular ring centered said axis.

17. The mechanism of claim 16 wherein (a) each of said surfaces of said second set constitutes an annular ring centered about said axis and (b) said second holding means includes (1) a tab extending from said ring towards said axis, (2) a tubular shaft passing through the center of the rings of said first and second sets, said shaft having a notch in the outer surface thereof into which said tabs of said surfaces of said second set enter, and (3) means for holding said shaft rigid relative to said base.

18. The mechanism of claim 17 wherein said pressure means includes a spring centered about said axis, a bolt with a head and passing through the center of said surfaces of said first and second sets, said spring and said tubular shaft, and a nut screwed onto said bolt, said surfaces of said first and second sets and said spring lying between the said head of said bolt and said nut with said head of said bolt and said nut urging said surfaces of said first and second sets and said spring toward each other.

19. The mechanism of claim 18 wherein said bolt and said nut only make contact with surfaces remaining fixed relative to said second object.

20. The mechanism of claim 19 wherein said second object constitutes a base, said first object rotates around said base and is attached thereto by arms connected to said first object extending on either side of at least a portion of said base, and said surfaces of said first and second sets are located within said arm.

21. The mechanism of claim 20 wherein said first holding means includes tabs affixed to said surfaces of said first set, said tabs extending from said surfaces in a direction away from said axis, said tabs being coupled to and moving with said arm.

22. The mechanism of claim 21 including retaining means, coupled to either said bolt or said nut, for inhibiting the disengagement of said bolt from said nut.

* * * * *